Patented Oct. 19, 1948

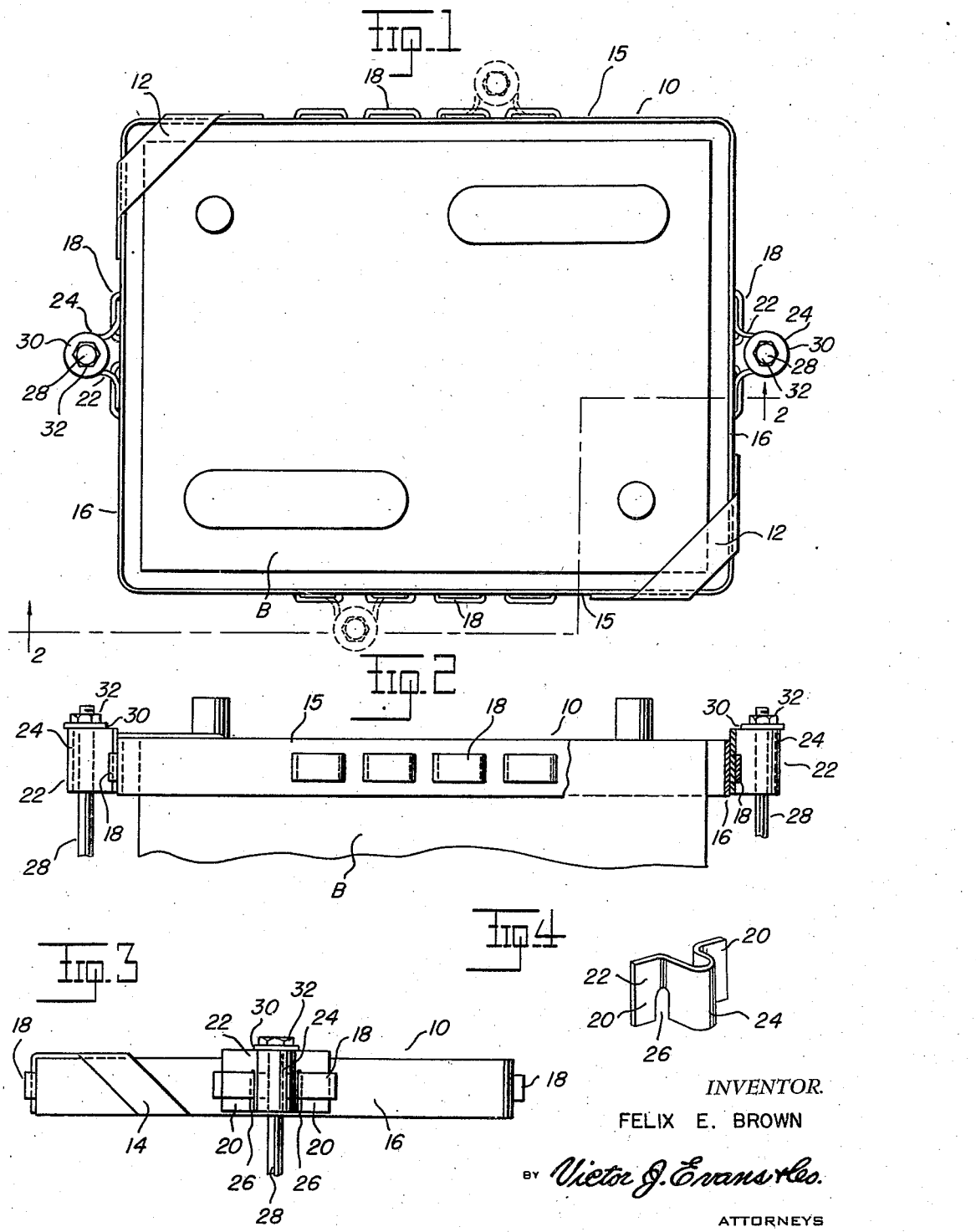

2,451,532

UNITED STATES PATENT OFFICE 2,451,532

BATTERY HOLDING DEVICE

Felix E. Brown, Bethlehem, Pa.

Application April 12, 1945, Serial No. 587,993

2 Claims. (Cl. 180—68.5)

This invention relates to a battery hold down frame assembly for batteries used in conjunction with the electrical system of an automobile, or other gas propelled vehicle that requires the use of a storage battery for the operation thereof.

An object of the invention is to provide a device which is applicable for use with various types of battery supports whether the supports be positioned at the end or on the sides of the battery.

Another object of the invention is to provide a device that can be readily fabricated out of sheet metal straps which can be easily welded together to form a unitary structure.

A further object of the invention is to provide a device that is simple and economical of construction, that can be easily and quickly applied or removed and is efficient in its operation.

With these and other objects in view as will appear as the description proceeds, the invention consists of certain novel features of construction, combination and arrangement of parts as will be hereinafter described in detail and set forth in the appended claims, reference being had to the accompanying drawing in which:

Fig. 1 is a top plan view of an embodiment of the invention as applied to a battery showing by dotted lines the varied positions in which the supporting means can be attached thereto.

Fig. 2 is a side view thereof.

Fig. 3 is an end view thereof, and

Fig. 4 is a perspective view of the clip used in conjunction with the hold down frame.

Referring more in detail to the drawing the numeral 10 indicates the battery frame which is made from strap metal and in any convential size or shape as desired.

The frame 10 is provided at opposed corners with strips forming cleats 12 which extend diagonally across the corners of the frame 10 and form a means for holding the battery B in position. The integral ends 14 of the cleats 12 extend downwardly over the outer sides of the frame 10 and are spot welded to the frame 10 at its outer end.

It is to be understood that only two cleats 12 may be used as shown, or each of the corners of the frame 10 may be provided with such cleats.

The structure as described provides a rigid assembly which will rest on the top of the battery B and securely hold it in position by means later to be described.

The sides 15 and ends 16 of the frame 10 are provided with struck out relatively spaced rectangular shaped flat loops 18 which are of sufficient width and depth to receive the leg portion 20 of the clip 22.

The clip 22 being made of a rectangular piece of strip metal bent inwardly at its medial portion to form a U-shaped loop 24 with extended flanges at the ends, and having vertical slots 26 positioned on both sides of the loop separating the leg portions 20 of the clip 22.

The operation of the device is substantially as follows:

The frame 10 is placed on the battery B as shown in Fig. 1. If the battery supports or bolts 28 are on the ends the loop 24 is placed over the bolts 28 and the legs 20 of the clip 22 are inserted in the loops 18 on the ends 16 of the frame 10.

A washer 30 of greater circumference than the loop 24 is then placed over the supports 28 and rests on the loop 24.

When a nut 32 is threaded downward on the supports 28 the hold down frame is tightened down upon the battery and the battery is held securely and firmly in position.

As previously explained with loops on sides and ends of the frame, the frame can be retained in place by means of the supports being positioned parallel to either the sides or the ends.

Though there is shown and described a particular construction, combination and arrangement of parts, it is to be understood that the invention is not to be limited to this particular construction, combination and arrangement, but may be changed or modified within the spirit of the invention, or the scope of the appended claims.

Having thus described the invention, what is claimed as new and desired to be secured by Letters Patent is:

1. A battery retaining device, comprising a rectangular-shaped frame having comparatively narrow side and end panels with diagonally disposed strips connecting the upper edges of the panels of corners of the frame for engaging the upper end of a battery to hold the battery downwardly, the panels of said frame having pairs of flat loops struck from intermediate portions thereof and extended outwardly with the inner surfaces of the loops spaced from the outer surfaces of the panels, and U-shaped clips with outwardly extended flanges at the ends and having slots in the lower edges positioned on the loops struck from the frame with the flanges thereof in the loops, and with the slots in the lower edges of the clips positioned over the ends of the loops.

2. A battery retaining device, comprising a rectangular-shaped frame having comparatively narrow side and end panels with diagonally disposed strips connecting the upper edges of the panels of corners of the frame for engaging the upper end of a battery to hold the battery downwardly, the panels of said frame having pairs of flat loops struck from intermediate portions thereof and extended outwardly with the inner surfaces of the loops spaced from the outer surfaces of the panels, and U-shaped clips with outwardly extended flanges at the ends and having slots in the lower edges positioned on the loops struck from the frame with the flanges thereof in the loops, and with the slots in the lower edges of the clips positioned over the ends of the loops, the upper ends of said loops extended upwardly above the upper surface of the frame.

FELIX E. BROWN.

REFERENCES CITED

The following references are of record in the file of this patent:

UNITED STATES PATENTS

| Number | Name | Date |
|---|---|---|
| 2,155,941 | Jaskey | Apr. 25, 1939 |
| 2,257,155 | Bowers | Sept. 30, 1941 |
| 2,326,481 | Meyer | Aug. 10, 1943 |